United States Patent [19]

Stephens

[11] 4,210,574
[45] Jul. 1, 1980

[54] PROCESS FOR PREPARING FILLED POLYVINYL CHLORIDE COMPOSITIONS

[75] Inventor: Ruth E. Stephens, Royal Oak, Mich.

[73] Assignee: Ethyl Corporation, Richmond, Va.

[21] Appl. No.: 907,992

[22] Filed: May 22, 1978

Related U.S. Application Data

[62] Division of Ser. No. 655,125, Feb. 4, 1976, Pat. No. 4,132,700.

[51] Int. Cl.$^2$ ............................................... C08K 9/04
[52] U.S. Cl. ......................... 260/42.16; 106/308 N; 260/37 EP; 260/40 R
[58] Field of Search ................ 260/42.16; 106/308 N

[56] References Cited

U.S. PATENT DOCUMENTS

| | | | |
|---|---|---|---|
| 2,578,605 | 12/1951 | Sears | 260/42.16 |
| 2,890,190 | 6/1959 | Volkenburgh | 260/42.16 |
| 3,471,439 | 10/1969 | Bixler et al. | 260/42.16 |
| 3,963,512 | 6/1976 | Swift et al. | 260/42.14 |

*Primary Examiner*—James H. Derrington
*Attorney, Agent, or Firm*—Donald L. Johnson; Robert A. Linn; Willard G. Montgomery

[57] ABSTRACT

A process for preparing polyvinyl chloride compositions containing talc or kaolinite fillers.

8 Claims, No Drawings

PROCESS FOR PREPARING FILLED POLYVINYL CHLORIDE COMPOSITIONS

This is a division, of application Ser. No. 655,125, filed Feb. 4, 1976, now U.S. Pat. No. 4,132,700.

BACKGROUND OF THE INVENTION

Particles of siliceous solids have found wide utility in many fields. Among other uses, they have been used to fill, extend, thicken and reinforce various organic materials such as rubber and other elastomers. Since the usefulness of these siliceous solids has been hampered and retarded by their surface characteristics, i.e., strong affinity for water and a relatively low affinity for organic materials, these materials have been treated to increase their affinity for organic materials and decrease their affinity for water. These surface treatments have included the introduction of various substances to render the siliceous materials organophilic. Among the various materials used to treat these siliceous materials to render them organophilic have been primary and secondary alcohols, as taught by Iler in U.S. Pat. No. 2,727,876; and partially hydrolyzed esters of hydrocarbon substituted silicas, as taught by Vanderbilt et al. in U.S. Pat. No. 3,350,345. This treatment of siliceous materials to make them organophilic requires the use of expensive chemicals, elevated temperatures, and special handling procedures, all of which result in economic penalties as regards the finished product. Furthermore, it has generally been accepted in the prior art that plastics filled with organophilic minerals have better physical properties than those filled with minerals which are not organophilic. It is generally believed that the organic molecule which is chemically attached to the mineral surface forms a bond to the plastic or becomes entangled in the polymer chain, thus resulting in a stronger product.

It has now been discovered that washing siliceous materials, especially talc and kaolinite, with an aqueous solution of an acid and incorporating these acid treated minerals into polyvinyl chloride results in an improved polyvinyl chloride composition having increased tensile strength.

The acid washing does not make these minerals organophilic and there is no need with the acid treatment of the present invention to make these minerals organophilic before they are blended with the polyvinyl chloride compositions.

SUMMARY OF THE INVENTION

A process for preparing polyvinyl chloride compositions containing talc or kaolinite fillers comprising washing the talc or kaolinite with an aqueous solution of a mineral acid and thereafter incorporating the washed talc or kaolinite into the polyvinyl chloride. A reinforced composition comprising polyvinyl chloride and finely divided talc or kaolinite filler which has been pretreated with an acid.

DESCRIPTION OF THE PREFERRED EMBODIMENTS

An embodiment of this invention is a process for preparing reinforced polyvinyl chloride compositions of improved tensile strength containing acid pretreated talc filler material and the reinforced polyvinyl chloride compositions of improved tensile strength containing the acid pretreated talc filler.

Another embodiment of the present invention is a process for preparing polyvinyl chloride compositions of improved tensile strength and color containing pretreated kaolinite filler material and the reinforced polyvinyl chloride compositions of improved tensile strength having incorporated therein the pretreated kaolinite filler.

The present invention provides a talc or kaolinite filled polyvinyl chloride composition which has the advantages of improved tensile strength, reduced costs, and good color. Using the process of the present invention these improved polyvinyl chloride compositions are provided while utilizing a relatively simple and inexpensive pretreatment of the talc or kaolinite fillers. The process of the present invention provides talc or kaolinite filler materials which are compatible with the polyvinyl chloride and enhance the properties thereof.

The present invention principally contemplates polyvinyl chloride compositions and base stocks for polyvinyl chloride compositions; however, the broader aspects also include other types of plastics and resins, such as polypropylene, polyethylene, ABS, polyesters, epoxies and the like. The present invention principally contemplates talc and kaolinite; however, the broader aspects of the invention also include other types of siliceous solids used as fillers such as amorphous silica and metal silicates, both mineral and synthetic.

The polyvinyl chloride compositions of the present invention can be the polyvinyl chloride polymer alone or, more preferably, polyvinyl chloride polymer blended with various additives well known in the art such as fillers, stabilizers plasticizers, lubricants, and pigments. The composition of the ingredients used in formulation of the compound, i.e., polyvinyl chloride composition, is varied to suit the end use application. The amount and type of plasticizer varies depending upon whether the application is to be at low or high temperatures. Adipates and sebacates are used for cold applications while the less volatile phthalates and phosphates find applications for higher-temperature service. Lead stabilizers are used as well as barium-cadmium compounds and epoxy stabilizers.

Talc and kaolinite are silicate minerals available commercially in large quantities. Talc is a hydrated magnesium silicate, $3MgO.4SiO_2 \cdot H_2O$, occurring as platelet microcrystals. Kaolinite is an aluminum silicate, $Al_2O_3 \cdot Si_2O_4$, which can be obtained in either a hydrated, $Al_2O_3 \cdot SiO_4 \cdot 2H_2O$, or as an anhydrous form.

Briefly stated, one embodiment of the present invention is a process which comprises washing amounts of finely divided talc with an acid. The washed talc is then removed from the acid solution, dried, and incorporated into the polyvinyl chloride formulation.

In the treatment step the treat solution contains an acid. The preferred acid is an inorganic acid. The mineral acids are more preferred. Some non-limiting examples of mineral acids are hydrochloric, nitric, nitrous, phosphoric, phosphorous, sulfuric, sulfurous, hydrofluoric, boric, arsenic, carbonic, chromic, hydrocyanic, hypochlorus, hypobromus, and and like.

In the practice of one embodiment of this invention finely divided particles of talc are treated with an acid solution, preferably a solution of dilute aqueous mineral acid. The talc is added to a dilute aqueous mineral acid solution to form a slurry. It is believed that these acid washings remove carbonate impurities from the talc, as evidenced by foaming of the acidified slurry. After foaming has stopped the solid talc is removed from the slurry, as by centrifuging and filtering and washed with water. The talc is then dried and blended with the polyvinyl chloride.

These acid washed talcs have been found to be effective in increasing the tensile strength of the polyvinyl chloride compositions without the need of making them organophilic by treatment with various chemicals aforediscussed. As a matter of fact, as can be seen by the results set forth in Table I below, making the talc organophilic actually tends to result in a polyvinyl chloride compound of decreased tensile strength.

While not being bound by any theory, it is believed that the acid treatment of the talc and kaolinite removes the potassium, sodium and carbonate which are present as impurities on the talc or kaolinite. The removal of these impurities in effect removes the sites of potential weakness from the mineral-plastic interface when the filler minerals are blended with the polyvinyl chloride thereby resulting in increased tensile strength of the finished compound.

The following examples will illustrate the process of the present invention.

EXAMPLE 1

A dilute solution of hydrochloric acid was prepared by adding 10 ml of concentrated hydrochloric acid to 1 liter of water. To this dilute acid solution were added 454 grams of finely divided talc to form a slurry. When all foaming had ceased the slurry was centrifuged and filtered. The solid was then washed with water and dried. Drying was accomplished by placing the solid in an oven and heating for 24 hours at about 100° F.

EXAMPLE 2

The treated talc of Example 1 was compounded with polyvinyl chloride so as to form 30% by weight of the polyvinyl chloride composition. 120 grams of talc powder were mixed with 400 grams of polyvinyl chloride, first by hand and then for 10 minutes on a Hobart mixer. The mix was then milled for several minutes on a mill at 375°-385° F. and then sheeted out. The sheet was cut into convenient sized pieces and pressed into ⅛ and ¼ inch sheets at 370° F. for a warm-up period of 6 minutes and a 2 minute hold at 25,000 lbs. ram force. The pressure was released and the mold assembly transferred to a cold press where a pressure of 25,000–30,000 lbs. ram force was applied for 2 minutes at which time the assembly was at room temperature. Samples were cut from these sheets for tensile strength tests.

EXAMPLE 3

Untreated talc was blended into polyvinyl chloride according to the procedure of Example 2. Samples were cut from the polyvinyl sheets thus formulated for tensile strength tests.

EXAMPLE 4

To 1 liter of water were added 454 grams of finely divided talc to form a slurry. The slurry was allowed to stand at room temperature for about 1 hour. After this period the slurry was centrifuged with filtering to separate the solid talc particles. The filtered particles were dried at about 100° F. for 24 hours.

EXAMPLE 5

The water treated talc of Example 4 was then compounded with polyvinyl chloride according to the procedure of Example 2. Samples were cut from the talc filled polyvinyl chloride sheets thus formulated for tensile strength tests.

EXAMPLE 6

Finely divided talc was treated with hydroxy stearic acid to make the talc particles organophilic. The talc particles were coated with 2 weight percent hydroxy stearic acid by treating 454 grams of talc with an aqueous solution containing 2 weight percent hydroxy stearic acid. The 454 grams of talc were added to a one-liter solution containing 2 weight percent of hydroxy stearic acid to form a slurry. The slurry was then centrifuged with filtering to collect the coated talc particles. The talc particles were then heated to 165° C. to bond the hydroxy stearic acid to the talc particles, thus making them organophilic.

EXAMPLE 7

The organophilic talc prepared in Example 6 above was then compounded with a polyvinyl chloride composition following the procedure of Example 2. Samples were then cut from the polyvinyl chloride sheet for testing of physical properties.

EXAMPLE 8

A blend of polyvinyl chloride was prepared in accordance with the procedure of Example 2 except that no talc filler was added. Samples were cut from the polyvinyl chloride sheet blend for testing of physical properties.

The following table shows the physical properties of the polyvinyl chloride compositions compounded as above described. The physical properties measured were tensile strength, tensile modulus, flexural strength, Izod impact resistance and deflection temperature. The test methods used are described in ASTM D 638-72, ASTM D 790-71, ASTM D 256-73 and ASTM D 648-72. Prior to testing the test samples were aged and conditioned as described in ASTM D 618-61.

TABLE I

| Ex. No. | Minerals | Treatment | Tensile Strength p.s.i.g. | Modulus of Elasticity p.s.i.g. | Flexural Strength p.s.i. | Impact Strength (Izod) ft. lbs/in | Deflection Temp., °F. |
|---|---|---|---|---|---|---|---|
| 8 | None | None | 7,090 | 431,000 | 13,900 | 0.74 | 162 |
| 3 | Talc | None | 7,200 | 996,000 | 13,500 | 0.73 | 167 |
| 2 | Talc | Dilute HCl | 7,480 | 1,010,000 | 13,200 | 0.71 | 167 |
| 5 | Talc | Water | 7,000 | 867,000 | 13,300 | 0.76 | 167 |
| 6 | Talc | Hydroxy stearic acid, heated, organo- | 5,430 | 806,000 | 14,000 | 0.72 | 167 |

TABLE I-continued

| Ex. No. | Minerals | Treatment | Tensile Strength p.s.i.g. | Modulus of Elasticity p.s.i.g. | Flexural Strength p.s.i. | Impact Strength (Izod) ft. lbs/in | Deflection Temp., °F. |
|---|---|---|---|---|---|---|---|
| | | philic | | | | | |

As can be seen from Table I the acid washed talc imparts a greater tensile strength to the polyvinyl chloride than the untreated or water washed talc and a much greater tensile strength than the organophilic talc.

The pretreatment of the talc can be carried out at ambient conditions of temperature and pressure. Although elevated temperatures can be used they are not required. Although it is desirable to wash the acid treated talc with water this is not absolutely necessary. Drying of the talc after the acid treatment may be by air-drying, by heating or by a combination of the two.

Thus another embodiment of the present invention is a reinforced polyvinyl chloride composition of improved tensile strength containing from about 10 to about 50 weight percent of finely divided talc filler, said talc filler having been pretreated with an aqueous solution of mineral acid.

A more preferred embodiment of the present invention is a novel solid shaped article of improved tensile strength comprising polyvinyl chloride and finely divided talc filler. The talc filler comprises from about 10 to about 50% by weight of the solid shaped article. In a most preferred embodiment the solid shaped article is a pipe.

A yet another more preferred embodiment of the present invention is a process for preparing novel solid shaped articles of improved tensile strength comprising the steps of (1) pretreating finely divided talc with an acid, preferably a mineral acid, (2) admixing said pretreated talc with a polyvinyl chloride compound, the amount of talc in the resulting mixture being in the range of from about 10 to about 50% by weight, and (3) thereafter forming said mixture into a predetermined shape.

In admixing the talc with the polyvinyl compound, which can be polyvinyl chloride polymer alone, but which is preferably a composition comprised of the polyvinyl chloride polymer and various other known modifiers discussed above, it is important that the talc have a very high degree of dispersion before addition to the plastic and that it be thoroughly dispersed in the plastic composition. Mineral particles held together in the form of small granules or clumps may hold trapped air when introduced into the plastic produce compositions of decreased tensile strength as compared with those compositions wherein the mineral particles are thoroughly dispersed.

Yet another embodiment of the present invention comprises a process for pretreating kaolinite and compounding a polyvinyl chloride composition containing said pretreated kaolinite as filler. As discussed above kaolinite is a siliceous material having the general formula $Al_2O_3 \cdot Si_2O_4 \cdot 2H_2O$.

It has been found, similarly to the talc filler, that when kaolinite is washed with an acid wash, preferably a mineral acid wash, and then compounded with polyvinyl chloride the tensile strength of the polyvinyl chloride is increased over a polyvinyl chloride composition containing no kaolinite, and over that of a polyvinyl chloride composition containing kaolinite which has not been treated according to the process of the present invention.

In the practice of the present invention fine particles of kaolinite, those having a size of 100 mesh or smaller, are washed with an aqueous acid solution, preferably an aqueous mineral acid solution. The washing is accomplished by adding the finely divided kaolinite to the acid solution thereby forming a slurry of kaolinite and aqueous acid. The kaolinite particles are then separated from the slurry as by centrifuging and filtering. Thereafter the kaolinite particles are washed with water and dried.

After drying the kaolinite is compounded with polyvinyl chloride compositions, usually in amounts sufficient to form from about 10 to about 50 weight percent of the polyvinyl chloride composition.

The following examples serve to illustrate the process of the present invention.

EXAMPLE 9

A dilute solution of hydrochloric acid is prepared by adding 10 ml of concentrated hydrochloric acid to 1 liter of water. To this dilute acid solution are added 454 grams of finely divided kaolinite to form a slurry. The slurry is then centrifuged and filtered to separate the solid kaolinite from the liquid wash solution. The kaolinite is then washed with water and dried at about 100° F. until the kaolinite particles are dry.

EXAMPLE 10

The acid treated kaolinite of Example 9 was compounded with polyvinyl chloride so as to form 30% by weight of the polyvinyl chloride composition. One hundred twenty grams of kaolinite powder were mixed with 400 grams of polyvinyl chloride, first by hand and then for 10 minutes on a Hobart mixer. The mixer was then milled for several minutes on a mill at 375°–385° F. and then sheeted out. The sheet was cut into convenient sized pieces and pressed into ⅛ and ¼ inch sheets at 370° F. for a warm-up period of 6 minutes and a 2-minute hold at 25,000 lbs. ram force. The pressure was released and the mold assembly transferred to a cold press where a pressure of 25,000–30,000 lbs. ram force was applied for 2 minutes at which time the assembly was at room temperature. Samples were cut from these sheets for tensile strength tests.

EXAMPLE 11

Untreated kaolinite, having a particle size of 100 mesh or less, was blended into polyvinyl chloride according to the procedure of Example 10. Samples were cut from the polyvinyl sheets thus formulated for tensile strength tests.

The following table shows the physical properties of the polyvinyl chloride compositions compounded in accordance with the above procedures.

TABLE II

| Ex. No. | Minerals | Treatment | Tensile Strength p.s.i.g. | Modulus of Elasticity p.s.i.g. | Flexural Strength p.s.i. | Impact Strength (Izod) ft. lbs/in | Deflection Temp., °F. |
|---|---|---|---|---|---|---|---|
| 8 | None | None | 7,090 | 431,000 | 13,900 | 0.74 | 162 |
| 11 | Kaolinite | None | 6,790 | 760,000 | 14,200 | 0.61 | 165 |
| 10 | Kaolinite | Dilute HCl | 7,670 | 963,000 | 15,000 | 0.66 | 165 |

As can be seen from Table II the acid treated kaolinite filled polyvinyl chloride composition has a greater tensile strength than either the polyvinyl chloride composition without any kaolinite fillers or the polyvinyl chloride composition containing the untreated kaolinite filler.

it is thus apparent that, for reasons not clearly understood, the acid washed kaolinite, when used as a filler in a polyvinyl chloride composition, is compatable with said polyvinyl chloride without being treated to make it organophilic and imparts improved tensile strength properties thereto.

While the acid treated kaolinite increases the tensile strength of and is compatable with polyvinyl chloride there is nevertheless a slight disadvantage in that it, the acid treated kaolinite, imparts a grayish color to the polyvinyl chloride composition which is normally an ivory color. It has been discovered that if kaolinite is treated with ammonia or an amine the color of the polyvinyl chloride composition is improved and, at the same time, the tensile strength is also increased.

Thus, yet another embodiment of the present invention is in a process reinforcing polyvinyl chloride the step of mixing into the polyvinyl chloride fine kaolinite particles which have been pretreated by washing with an aqueous solution containing a compound selected from the group consisting of ammonia and amines.

A more preferred embodiment of the present invention is a novel solid shaped article of improved tensile strength comprising polyvinyl chloride and finely divided kaolinite filler. The kaolinite filler comprises from about 10 to about 50% by weight of the solid shaped article. In a most preferred embodiment the solid shaped article is a pipe.

A yet another more preferred embodiment of the present invention comprises a process for forming novel solid shaped articles of improved tensile strength comprising the steps of (1) pretreating finely divided kaolinite with an acid, preferably a mineral acid, (2) admixing said pretreated kaolinite with a polyvinyl chloride compound, the amount of kaolinite in the resulting mixture being in the range of from about 10 to about 50% by weight, and (3) thereafter forming said mixture into a predetermined shape.

In admixing the kaolinite with the polyvinyl chloride compound, which can be polyvinyl chloride polymer alone, but which is preferably a composition comprised of the polyvinyl chloride polymer and various other known modifiers of the type previously described, it is important that the kaolinite have a very high degree of dispersion before addition to the plastic and that it be thoroughly dispersed in the plastic composition.

Also encompassed within the scope of the present invention is a reinforced polyvinyl chloride composition containing preferably from about 10 to about 50 weight percent, of fine kaolinite particles which have been pretreated with ammonia or an amine.

The amines may be primary, secondary, tertiary or quaternary amines. They may be aliphatic or aromatic. They may be monoamines, diamines, or polyamines.

Thus, primary, secondary, and tertiary alkyl amines may be used. Examples of primary alkyl amines are methyl amine, ethyl amine, n-propyl amine, isopropyl amine, n-butyl amine, isobutyl amine, 2-ethylhexyl amine, dodecyl amine, stearyl amine, eicosyl amine, triacontyl amine, pentacontyl amine, and the like, including those in which the alkyl group contains from 1 to about 50 carbon atoms. Examples of secondary alkyl amines are dimethyl amine, diethyl amine, methylethyl amine, methylbutyl amine, di-n-hexyl amine, methyl dodecyl amine, dieicosyl amine, methyl triacontyl amine, dipentacontyl amine, and the like, including mixtures thereof. Examples of tertiary alkyl amines are trimethyl amine, triethyl amine, N-ethyl-N-methylpropyl amine, dimethyl-sec-butyl amine.

Primary, secondary or tertiary aromatic amines may also be used. Examples of these aromatic amines include aniline, N-methyl aniline, ortho-, meta- and paratoluidine, α-naphthyl amine, N-methyl-N-ethylaniline, diphenyl amine, N,N-dimethylaniline, and the like.

Examples of polyamines, both aliphatic and aromatic, include ethylene, diamine, diethylene triamine, triethylene tetramine, tetraethylene pentamine, pentaethylene hexamine, propylene diamine, dipropylene triamine, tripropylene tetramine, tetrapropylene pentamine, butylene diamine, dibutylene triamine, diisobutylene triamine, tributylene tetramine; N,N-dimethyl-1,3-propanediamine; N,N-dibutyl-1,3-propanediamine; N,N-dihexyl-1,3-propanediamine; N,N-dimethyl-1,3-hexanediamine; N,N-dimethyl-1,3-butanediamine, ortho-, meta-, and paraphenylenediamine.

Alicyclic amines can also be used. Examples of alicyclic amines include cyclopropylamine, cyclohexylamine, (cyclophexylmethyl)amine, and the like. Heterocyclic amines can also be used. These included morpholine, thiomorpholine, pyrrole, pyrroline, pyrrolidine, indole, pyrazole, pyrazoline, pyralolidine, imidazole, imidazoline, imidazolidine, piperidine, phenoxazine, phenathiazine, and mixtures thereof, including their substituted homologs in which the substituent groups include alkyl, aryl, alkaryl, aralkyl, cycloalkyl, trimethylhexyl ammonium chloride, trimethylhexyl ammonium nitrate, trimethylheptyl ammonium sulfates, and the like.

Quaternary amines can also be used. Examples of quaternary amines include dimethyl dicoco ammonium chloride, trimethyl-n-propylammonium chloride, tetramethylammonium chloride tetraethylammonium chloride, triethyl-n-propylammonium nitrate, and the like.

Preferred amines are the aliphatic, aromatic, alicyclic, heterocyclic and quaternary amines having up to about 20 carbon atoms.

In the practice of this embodiment of the present invention finely divided kaolinite is treated with ammonia or an amine and the treated kaolinite is then compounded into the polyvinyl chloride composition. In a preferred embodiment the kaolinite is treated with a dilute aqueous solution of ammonia or an amine. One preferred method of this treating the kaolinite is to add the kaolinite powder to a dilute solution of ammonia or an amine to form a slurry, agitate said slurry to thoroughly expose the kaolinite powder to the action of the solution, separate the solid kaolinite powder from the slurry, as by centrifuging and filtering, dry the separated powder, and then incorporate the kaolinite powder into the polyvinyl chloride.

The following examples serve to illustrate the practice of this embodiment of the present invention.

EXAMPLE 12

A dilute 1 liter aqueous solution containing 0.2 weight percent of dicoco ammonium chloride is formulated. To this solution are added 454 grams of finely divided kaolinite particles.

The resultant slurry is thoroughly mixed. The kaolinite particles are then separated from the slurry by centrifuging and filtering. The kaolinite is then dried at about 100° F.

EXAMPLE 13

The dimethyl dicoco ammonium chloride treated kaolinite of Example 12 was then compounded with polyvinyl chloride to form 30% by weight of the polyvinyl chloride composition in accordance with the procedure of Example 10. The resultant polyvinyl chloride sheets, from which samples were cut for tensile strength tests, were pale gray in color, as compared to a gray color of polyvinyl chloride sheets formulated using untreated or acid treated kaolinite.

Table III shows the physical properties of the polyvinyl chloride composition compounded in accordance with the procedure of Example 13.

While not wishing to be bound by any theory it is believed that kaolinite has an acidic surface and is unlike other mineral extenders in this respect. Apparently the ammonia or amine surface treatment of the kaolinite neutralizes some of these acidic sites which are responsible for the discoloration.

A preferred embodiment of the present invention is a reinforced solid shaped article of improved tensile strength and improved color comprising polyvinyl chloride and fine kaolinite, said kaolinite having been pretreated with ammonia or an amine. In a most preferred embodiment the shaped article is a pipe.

Another preferred embodiment is a process for making a solid shaped polyvinyl chloride article of improved tensile strength comprising the steps of (1) pretreating fine kaolinite particles with ammonia or an amine, (2) mixing the pretreated kaolinite with polyvinyl chloride compound, and (3) forming the resultant mixture into a predetermined shape.

I claim:

1. In a process for preparing a polyvinyl chloride composition having increased tensile strength and improved color, the step comprising adding to said polyvinyl chloride composition finely divided particles of kaolinite said particles having been pretreated by adding said particles to a dilute aqueous solution containing ammonia or an amine to form a slurry, agitating said slurry to thoroughly expose the kaolinite particles to the action of the solution, separating said particles from said slurry and drying said separated particles prior to incorporating said particles into said polyvinyl chloride composition.

2. The process of claim 1 wherein said kaolinite particles are added to said polyvinyl chloride composition so as to comprise from about 10% to about 50% by weight of the polyvinyl chloride compositions.

3. In a process for preparing a polyvinyl chloride

TABLE III

| Mineral | Treatment | Tensile Strength | Modulus of Elasticity p.s.i.g. | Flexural Strength p.s.i. | Impact Strength (Izod) ft. lbs/in | Deflection Temp. °F. | Color |
|---|---|---|---|---|---|---|---|
| Kaolinite | Dimethyl dicoco ammonium chloride | 8,080 | 1,000,000 | 14,200 | 0.69 | 165 | Pale gray |
| Kaolinite 30 | None | 6,790 | 760,000 | 14,200 | 0.61 | 165 | Dark gray |
| Kaolinite 30 | bis-(2-hydroxy ethyl) oleyl amine | 7,000 | 844,000 | 14,100 | 0.74 | 164 | Ivory |
| Kaolinite | Dilute nitric and phosphoric acid | 7,660 | 963,000 | 15,000 | 0.66 | 165 | Dark gray |

The polyvinyl chloride compositions containing the ammonia or amine treated kaolinite filler material posses superior color properties as compared to those compositions containing untreated kaolinite filler materials, i.e., ivory for the dimethyl dicoco ammonium chloride treated kaolinite against the gray of untreated kaolinite filler. As shown by the data in Table III the kaolinite treated with quaternary amines, i.e., quaternary ammonium salts, results, when used as a filler in polyvinyl chloride compositions, in compounds of increased tensile strength as well as improved color.

composition of increased tensile strength and improved color, the step comprising adding to said polyvinyl chloride composition finely divided particles of kaolinite said particles having been pretreated by adding said particles to a dilute aqueous solution containing bis-(2-hydroxyethyl)oleylamine to from a slurry, agitating said slurry to thoroughly expose the kaolinite particles to the action of the solution, separating said particles from said slurry and drying said separated particles prior to incorporating said particles into said polyvinyl chloride composition.

4. The process of claim 3 wherein said kaolinite particles are added to said polyvinyl chloride composition so as to comprise from about 10% to about 50% by weight of the polyvinyl chloride composition.

5. A composition comprising polyvinyl chloride and finely divided particles of kaolinite as filler material, said kaolinite particles having been pretreated by adding said particles to a dilute aqueous solution containing bis-(2-hydroxyethyl)oleylamine to form a slurry, agitating said slurry to thoroughly expose the kaolinite particles to the action of the solution, separating said particles from said slurry and drying said separated particles prior to incorporating said particles into said polyvinyl chloride composition.

6. The composition of claim 5 wherein said kaolinite particles comprise from about 10% to about 50% by weight of said polyvinyl chloride composition.

7. A reinforced solid shaped article having improved tensile strength and improved color comprised of polyvinyl chloride and finely divided particles of kaolinite as filler material, said kaolinite particles having been pretreated by adding said particles to a dilute aqueous solution containing bis-(2-hydroxyethyl)oleylamine to form a slurry, agitating said slurry to thoroughly expose the kaolinite particles to the action of the solution, separating said particles from said slurry and drying said separated particles prior to mixing said particles with said polyvinyl chloride and forming the resultant mixture into said shaped article.

8. The article of claim 7 wherein said kaolinite filler comprises from about 10% to about 50% by weight of said article.

* * * * *